Figure 1:
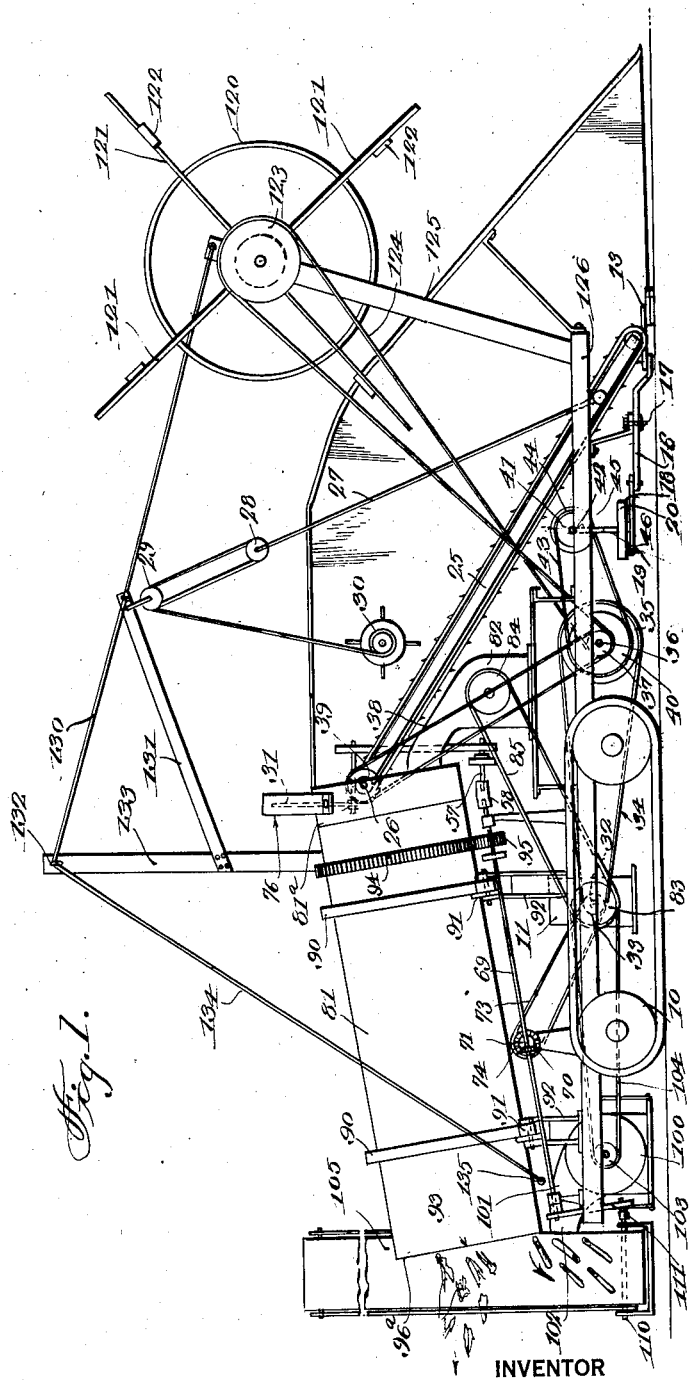

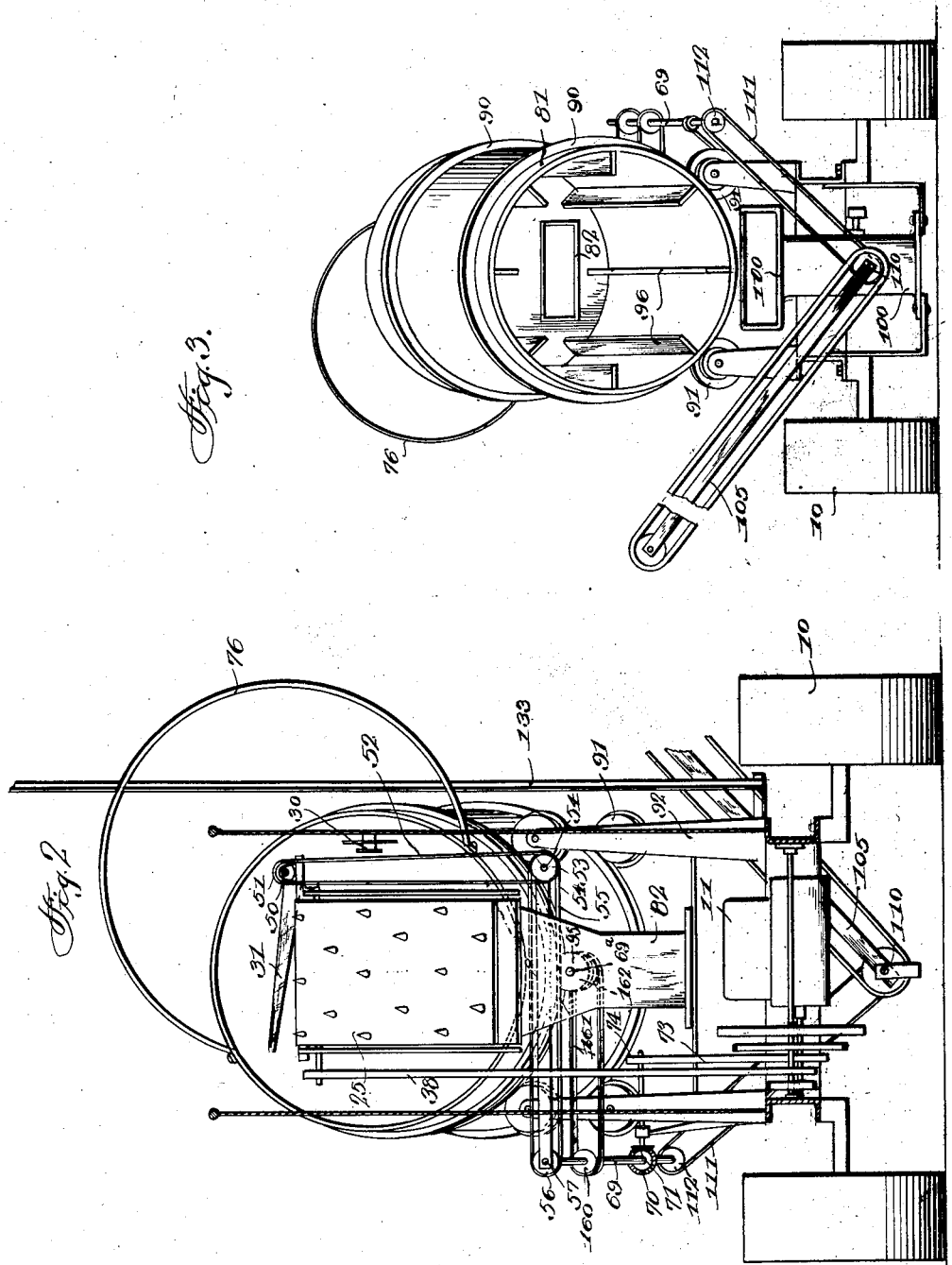

Feb. 5, 1935. E. C. PITCHER 1,990,250
CANE HARVESTING MACHINE
Filed May 15, 1930 3 Sheets-Sheet 3
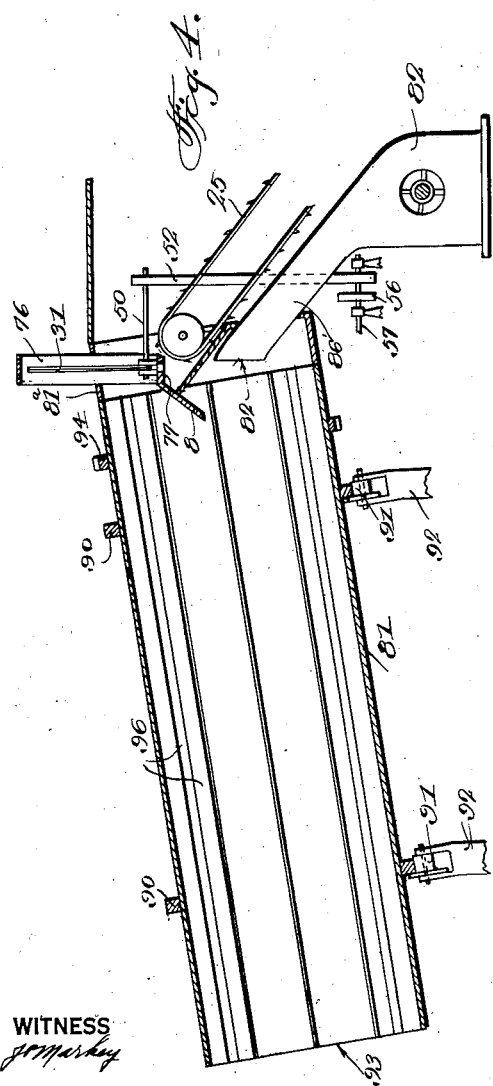
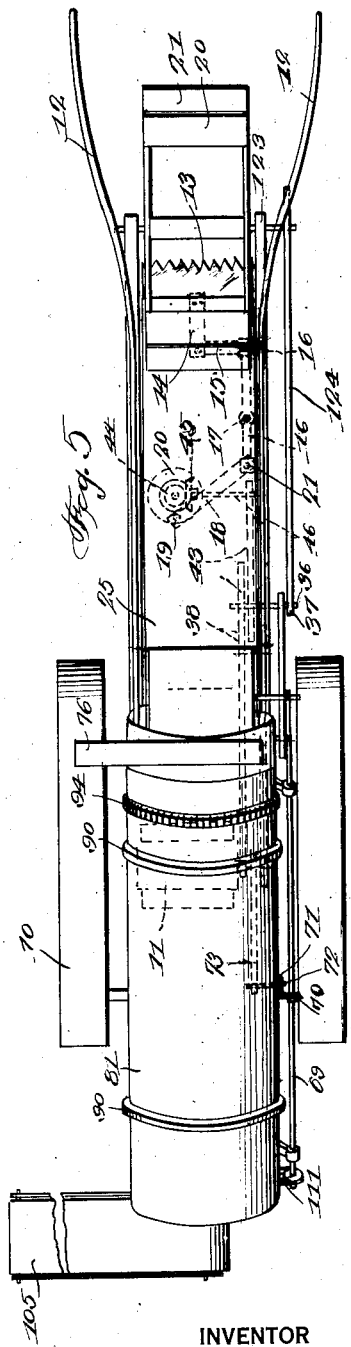
INVENTOR
Elmer C. Pitcher
BY
ATTORNEY Patented Feb. 5, 1935

1,990,250

UNITED STATES PATENT OFFICE 1,990,250

CANE HARVESTING MACHINE

Elmer C. Pitcher, Hayward, Calif., assignor to Falkiner Cane Harvester Corporation of America, New York, N. Y., a corporation of New York Application May 15, 1930, Serial No. 452,755

1 Claim. (Cl. 209—153)

This invention relates to cane harvesting machines and is more particularly directed to a device for cleaning the chopped cane of its leaves.

An object of the invention is the provision of an apparatus for causing a tortuous path to be taken by the chopped cane whereby the cane is moved progressively and through a path in the shape of a distorted spiral so that the leaves and tops will be freed from the chopped cane while a blast of air is forced directly through the center of the path of the cane for the removal of the lighter material, such as the leaves and tops.

Another object of the invention is the provision of a device in the form of a revolving cylinder carrying lifting blades disposed longitudinally of the inner wall of the cylinder for receiving chopped cane and for directing the cane through a tortuous path, the chopped cane being fed centrally and at the elevated end of the cylinder which is inclined at an angle to the horizontal, a blower being located adjacent to the feeding end for maintaining a continuous draft of air longitudinally of the axis of the cylinder for removing lighter material from the cane as it is progressively moved through the cylinder.

A further object of the invention is the provision of a device for removing leaves and tops and light material from chopped cane when said cane is being moved progressively through an inclined revolving cylinder, an air blast being provided for driving the lighter material substantially axially of the cylinder while a second blower is located at the discharge end of the cylinder for forcing a continuous blast of air through the discharging cane in order to remove any light material which may have remained with the cane.

A still further object of the invention is the provision of a harvester which is adapted to be moved through a cane field, a reciprocating cutter being employed at the forward end of the machine for cutting the cane after which the cane is moved toward a chopping device to form short lengths of the cane which is discharged into a cleaning device in the form of a cylinder located at an angle to the horizontal whereby the lighter material, such as leaves, are broken off from the chopped cane and removed at the discharge end of the cylinder independently of the chopped cane.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claim.

In the drawings:

Figure 1 is a side view in elevation of a cane harvesting machine constructed in accordance with the principles of my invention, Figure 2 is a front end view in elevation of the harvester, Figure 3 is a rear end view in elevation, Figure 4 is a longitudinal vertical section of the cleaning device, and Figure 5 is a plan view of the harvester.

Referring more particularly to the drawings, 10 designates generally a tractor which is adapted to be moved through a cane field under its own power while carrying the harvester. A motor 11 is mounted on the tractor, is independent of the motive power in the tractor and is adapted to operate the moving parts of the harvester.

At the forward end of the harvester is provided a pair of arms 12 which are curved and adapted to embrace a definite portion of the cane along the path of the tractor for moving the cane towards a reciprocating cutter 13. These arms are supported in any approved manner and are made of any material suitable for the purpose.

The cutter 13 is in the form of a reciprocating saw movable transversely of the harvester and is provided with a rearwardly extending arm 14 pivotally connected to a link 15. This link in turn is connected to one end of a lever 16 pivoted at 17 on the frame of the harvester. A link 18 eccentrically connected at 19 to a revolving wheel 20 is also pivotally connected at 21 to the rear end of the lever 16 so that as the wheel 20 is revolved the lever 16 will be oscillated for reciprocating the cutter 13. It will be noted that the arms 12 are bowed inwardly towards the cutter 13 so that the stalks will be directed into the cutting edge of the member 13.

A travelling carrier 25 is hingedly mounted on a shaft 26 intermediate the ends of the harvester and a cable 27 is trained on pulleys 28—29 and a winch 30 upon which the cable is adapted to be wound for elevating the forward end of the travelling carrier 25 when it is desired to elevate the travelling carrier. This carrier is adapted to move the stalks of the cane upwardly to the cutter 31.

The motor 11 drives a shaft 32 upon which is mounted a pulley 33 driving a belt 34 which in turn drives a pulley 35 and likewise a shaft 36. The shaft in turn drives a pulley 37 and a belt 38 trained on pulleys 37 and 39 drives the last-mentioned pulley and likewise the shaft 26 which operates the travelling carrier 25.

A pulley 40 is connected with the shaft 36 and drives a pulley 41 and a shaft 42 by means of a belt 43. The shaft 42 revolves a gear 44 connected with a gear 45. A shaft 46 driven by the gear 45 revolves the wheel of the disc 20 which in turn causes reciprocation of the cutter 13.

A revolving knife 31 is rigidly secured at one end to a shaft 50 which is driven by a pulley 51 and a belt 52. The belt is trained on a pulley 53 secured to a shaft 54, the shaft being in turn driven by a belt 55 which is trained on a pulley 56. The last-mentioned pulley is revolved by a shaft 57 having a universal connection at 58 with a shaft 69. A bevel gear 70 rigid with the shaft 69 is driven by a gear 71 which is revolved by a shaft 72. This shaft 72 is driven by means of a belt 73 and pulleys 74 and 33.

The knife 31 is mounted within a housing 76 carried by the harvester and revolves adjacent to one end of the platform 77 cutting the cane stalks into lengths of about 6". When the cane is cut the chopped cane falls upon an inclined apron 80 whence the cane is deposited directly into the upper elevated end of a revolving cylinder 81.

A blower 82 is driven by means of pulleys 83 and 84 and a belt 85 trained on said pulleys. This blower has an air conduit 86 which leads into the elevated end of the revolving cylinder 81 and directly below the free edge of the apron 80 so that a continuous blast of air will be forced axially and longitudinally of the cylinder for removing lighter material, such as leaves, from the chopped cane.

The cylinder 81 is made of metal and is provided with rings 90 at spaced intervals which are engaged by a pair of flanged rollers 91 mounted in bearings carried by standards 92. These rollers support the cylinder 81 at an angle to the horizontal so that the receiving end of the cylinder is located at a higher elevation than the discharge end 93. A ring gear 94 is secured to the outer wall of the cylinder and is driven by a gear 95 secured to a shaft 69ª. A box 81ª is stationary and has a tight fit with the upper end of the cylinder 81. The air conduit 86 and knife box open into said box and into the cylinder.

The interior of the cylinder is provided with a plurality of radially disposed ribs or blades 96 which extend longitudinally of the cylinder adapted to receive the chopped cane and for moving the cane in a semi-circular path as shown in Fig. 3 whence the cane will fall from the ribs adjacent the longitudinal axis of the cylinder and fall to the bottom of the cylinder and this happens periodically so that the cane follows a distorted spiral path through the cylinder. The agitation and beating of the pieces of cane by the ribs in the revolving cylinder will tend to break away leaves still clinging to pieces of the cane so that when the cane arrives at the discharge end it is substantially free of foreign matter or leaves.

A blower 100 having an air conduit 101 terminating at 102 adjacent to the lower rear end of the cylinder 81 is adapted to conduct a continuous blast of air through the chopped cane as it is discharged from the cylinder for removing any light materials still remaining in the cane. The blower is driven by means of a pulley 103, a belt 104 and the pulley 83 secured to the shaft 32. It will be noted that the outlet of the conduit 101 is directly below the rear end of the cylinder 81.

A travelling conveyor 105 is located adjacent to the rear end of the cylinder 81 and receives the cleaned chopped cane as it flows from the discharge end 93 of the cylinder and is carried away from the cylinder and stored in any suitable manner.

The conveyor 105 is driven by a shaft 110, a belt 111 and a pulley 112 which in turn is driven by the shaft 69.

A device which is located at the forward end of the harvester is adapted to move the stalks of the cane towards the travelling carrier 25 when the cane stalks are being cut and this device consists of a rotatable member 120 having spaced arms 121 connected by transverse bars 122 and said member is driven by a pulley 123, a belt 124 which is twisted and the pulley 37 connected to the shaft 36. The member 120 is supported by means of standards 125 carried by bars 126 forming a part of the framework of the harvester.

A cable 130 passes through an eye at the outer end of a bar 131 which supports the pulley 29. This cable is extended through an eye 132 at the upper end of a standard 133 and is continued downwardly as shown at 134 and connected at 135.

When the cane is chopped into 6" lengths, or approximately of such length, the pieces are discharged by the apron 80 into the elevated end of the cylinder 81 whence the cane will take a distorted spiral path through the revolving cylinder. The continuous draft of air from the drawer 82 is forced substantially along the longitudinal axis of the cylinder so that it will pick up light material and force it through the cylinder. It will also be noted that when the pieces of cane are elevated by the ribs or blades 96 they will fall by gravity after having reached the upper limit of their circular travel along the side walls of the cylinder, and will be precipitated across the path of the air forced through the cylinder so that pieces of cane are always exposed to the air in order to remove light pieces of material which are undesirable. The blast of air from the conduit 101 completes the cleaning operation.

It will be noted that the lifting blades or fins 96 run longitudinally of the cylinder 81 and extend inwardly for a short distance in radial planes. The cane is periodically lifted and then dropped across the longitudinal air blast. As the pieces of cane reach the lowermost point of travel, they are lifted to a point on the cylinder indicated at 96ª when they will fall outwardly and pass through a blast of air from the blower 100 for a final cleaning.

The shaft 69 drives a pulley 160 which in turn drives a belt 161, pulley 162 and a counter shaft 69ª. The gear 95 is driven by the shaft 69ª to which it is secured.

The blade 31 is revolved in synchronism with the feed conveyor in such a manner that the speed of the knife and the speed of the conveyor will be timed to cut off approximately six-inch lengths of the cane.

The stationary box 81 has a tight fit to the upper end of the revolving drum 81. The upper end of this box is closed except at the portion where the air blast enters the same and where a feed opening is provided to receive the cane.

I claim:

In a cane harvester, an inclined cylinder, means for feeding cut cane so that it will fall across the entrance to the cylinder, means for directing a blast of air through the cylinder, the air striking the cane as it falls across the cylinder entrance for removing severed cane leaves from the stalks and for carrying them out the open end of the cylinder, means for rotating the drum for tumbling the stalks for severing the leaves and for causing the stalks and leaves to pass through the air draft a number of times, and an auxiliary air draft for blowing through the stalks as they leave the cylinder for aiding in removing leaves.

ELMER C. PITCHER.